(12) United States Patent
San Agustin Lopez et al.

(10) Patent No.: US 9,851,791 B2
(45) Date of Patent: Dec. 26, 2017

(54) DYNAMIC EYE TRACKING CALIBRATION

(71) Applicant: Facebook, Inc., Menlo Park, CA (US)

(72) Inventors: Javier San Agustin Lopez, Copenhagen S (DK); Martin Henrik Tall, Frederiksberg C. (DK); Benjamin Antoine Georges Lefaudeux, Copenhagen (DK); Henrik Hegner Tomra Skovsgaard, Copenhagen K. (DK)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/940,658

(22) Filed: Nov. 13, 2015

(65) Prior Publication Data

US 2016/0139665 A1     May 19, 2016

Related U.S. Application Data

(60) Provisional application No. 62/079,871, filed on Nov. 14, 2014.

(51) Int. Cl.
*G06F 3/13* (2006.01)
*G06F 3/01* (2006.01)
(Continued)

(52) U.S. Cl.
CPC .............. *G06F 3/013* (2013.01); *G06F 3/038* (2013.01); *G06F 3/04842* (2013.01); *G06K 9/00604* (2013.01); *G06T 7/70* (2017.01)

(58) Field of Classification Search
CPC .......... G06F 3/017; G06F 3/013; G06F 1/163; G06F 3/016; G06F 3/011; G06F 3/0346
See application file for complete search history.

(56) References Cited

U.S. PATENT DOCUMENTS 7,986,816 B1    7/2011  Hoanca et al.
2006/0227116 A1  10/2006  Zotov et al.
(Continued)

FOREIGN PATENT DOCUMENTS

CN      105247447 A     1/2006
EP      2956844 A2      12/2015
(Continued)

OTHER PUBLICATIONS

"U.S. Appl. No. 14/180,974, Final Office Action dated Mar. 28, 2016", 16 pgs.
(Continued)

*Primary Examiner* — Olga Merkoulova
(74) *Attorney, Agent, or Firm* — Fenwick & West LLP

(57) ABSTRACT

A user of a computing device may interact with and control objects and applications displayed on the computing device through the user's eye movement. Detected gaze locations are correlated with actions performed by the user and compared with typical gaze locations for those actions. Based on differences between the detected and expected gaze locations, the eye tracking system can be recalibrated. An area around a gaze location encompassing a set of likely active locations can be enlarged, effectively prompting the user to interact with the desired active location again. The enlarging of the area serves to separate the active locations on the screen, reducing the probability of interpreting the user's gaze incorrectly.

20 Claims, 13 Drawing Sheets

(51) Int. Cl.
*G06F 3/038* (2013.01)
*G06K 9/00* (2006.01)
*G06F 3/0484* (2013.01)
*G06T 7/70* (2017.01)

(56) References Cited

U.S. PATENT DOCUMENTS

| | | | | |
|---|---|---|---|---|
| 2011/0254865 | A1* | 10/2011 | Yee | G06F 3/013 345/661 |
| 2011/0310006 | A1* | 12/2011 | Edwards | A61B 3/113 345/156 |
| 2012/0019662 | A1 | 1/2012 | Maltz | |
| 2012/0272179 | A1* | 10/2012 | Stafford | G06F 3/012 715/781 |
| 2014/0085198 | A1 | 3/2014 | Jahnke et al. | |
| 2014/0226131 | A1 | 8/2014 | Lopez et al. | |
| 2015/0084864 | A1 | 3/2015 | Geiss et al. | |
| 2016/0011658 | A1 | 1/2016 | Lopez et al. | |
| 2016/0128568 | A1* | 5/2016 | Bellamy | A61B 3/113 351/209 |

FOREIGN PATENT DOCUMENTS

| | | |
|---|---|---|
| WO | WO-0133323 A2 | 5/2001 |
| WO | WO-2012052061 A1 | 4/2012 |
| WO | WO-2014125380 A2 | 8/2014 |
| WO | WO-2015154882 A1 | 10/2015 |

OTHER PUBLICATIONS

"Chinese Application Serial No. 201480020096.6, Preliminary Amendment filed Apr. 14, 2016", W/ English Claims, 22 pgs.
"European Application Serial No. 14732364.6,Office Action dated Mar. 18, 2016", 3 pgs.
"International Application Serial No. PCT/IB2015/002218, International Search Report dated Apr. 1, 2016", 4 pgs.
"International Application Serial No. PCT/IB2015/002218, Written Opinion dated Apr. 1, 2016", 6 pgs.
"U.S. Appl. No. 14/180,974, Non-Final Office Action dated Oct. 7, 2015", 13 pgs.
"U.S. Appl. No. 14/180,974, Response filed Jan. 5, 2016 to Non-Final Office Action dated Oct. 7, 2015", 14 pgs.
"DynaVox Announces the EyeMax: New Eye Gaze System Provides Greater Independence", [Online]. Retrieved from the Internet: <URL: http://www.dynavoxtech.com/company/press/release/detail.aspx?id=11>, (Aug. 6, 2008), 2 pgs.
"International Application Serial No. PCT/EP2015/000755, International Search Report dated Jun. 9, 2015", 4 pgs.
"International Application Serial No. PCT/EP2015/000755, Written Opinion dated Jun. 9, 2015", 8 pgs.
"International Application Serial No. PCT/IB2014/000772, International Preliminary Report on Patentability dated May 22, 2015", 30 pgs.
"International Application Serial No. PCTIB2014/000772, International Search Report Aug. 13, 2014", 4 pgs.
"International Application Serial No. PCT/IB2014/000772, Written Opinion dated Feb. 9, 2015", 9 pgs.
"International Application Serial No. PCT/IB2014/000772, Written Opinion dated Aug. 13, 2014", 8 pgs.
"Tobii—the workd leader in eye tracking", Tobii AB, [Online]. Retrieved from the Internet: <URL: http://www.tobii.com/>, (Accessed Oct. 1, 2015), 2 pgs.
Blignaut, Pieter, et al., "TrackStick: a data quality measuring tool for Tobii eye trackers", Proceedings of the Symposium on Eye Tracking Research and Applications, (2012), 293-296.
Borah, Joshua, "Eye movement, measurement techniques for introduction", Encyclopedia of Medical Devices and Instrumentation, Second Edition, XP055196246, ISBN: 978-0-47-126358-6, Retrieved from the Internet: <http://onlinelibrary.wiley.com/store/10.1002/0471732877.emdll2/asset/emdll2.pdf?v=l&t=iazepui_9&s=e27c8b48342ad445e2821290a3c84564f8694987>, (Apr. 14, 2006), 263-286.
Fehringer, Benedict, et al., "Analysing the Potential of Adapting Head-Mounted Eye Tracker Calibration to a New User", International Symposium on Eye Tracking Research and Applications (ETRA), (2012), 4 pgs.
Jacob, Robert, "Eye Tracking in Advanced Interface Design", (2003), 53 pgs.
Ramanauskas, N, "Calibration of Video-Oculographical Eye-Tracking System", Electronics and Electrical Engineering. No. 8(72), (2006), 65-68.
Santella, Anthony, et al., "Robust Clustering of Eye Movement Recordings for Quantification of Visual Interest", Symposium on Eye Tracking Research and Applications, (2004), 1-8.
Yin, Shibin, et al., "A Vision-Based Self-Calibration Method for Robotic Visual Inspection Systems", Journal of Sensors 13(12), (2013), 16565-16582.
Zoccolan, Davide, et al., "A Self-Calibrating, Camera-based Eye Tracker for the Recording of Rodent Eye Movements", Frontiers in Neuroscience. vol. 4, Article 193, (Nov. 29, 2010), 1-12.
U.S. Appl. No. 14/180,974, filed Feb. 14, 2014, Systems and Methods of Eye Tracking Calibration.
U.S. Appl. No. 14/683,831, filed Apr. 10, 2015, Systems and Methods of Eye Tracking Calibration.

\* cited by examiner

"LOREM IPSUM DOLOR SIT AMET, CONSECTETUR ADIPISCING ELIT, SED DO EIUSMOD TEMPOR INCIDIDUNT UT LABORE ET DOLORE MAGNA ALIQUA. UT ENIM AD MINIM VENIAM, QUIS NOSTRUD EXERCITATION ULLAMCO LABORIS NISI UT ALIQUIP EX EA COMMODO CONSEQUAT. DUIS AUTE IRURE DOLOR IN REPREHENDERIT IN VOLUPTATE VELIT ESSE CILLUM DOLORE EU FUGIAT NULLA PARIATUR.

DYNAMIC EYE TRACKING CALIBRATION

PRIORITY CLAIM

The application claims priority to U.S. Provisional Patent Application No. 62/079,871, filed Nov. 14, 2014, entitled "Dynamic Eye Tracking Calibration," which is incorporated herein by reference in its entirety.

TECHNICAL FIELD

The present disclosure generally relates to user interfaces and controls that utilize eye tracking and, more specifically, to systems and methods for adjusting calibration of an eye tracking system during use. The present disclosure also relates to systems and methods for controlling a zoom function using eye tracking.

BRIEF DESCRIPTION OF THE DRAWINGS

Some example embodiments are illustrated by way of example and not of limitation in the figures of the accompanying drawings.

FIG. 10 is a conceptual diagram illustrating example relationships among a view point and active elements, shown in reference to some example embodiments.

DETAILED DESCRIPTION

Figure 1:
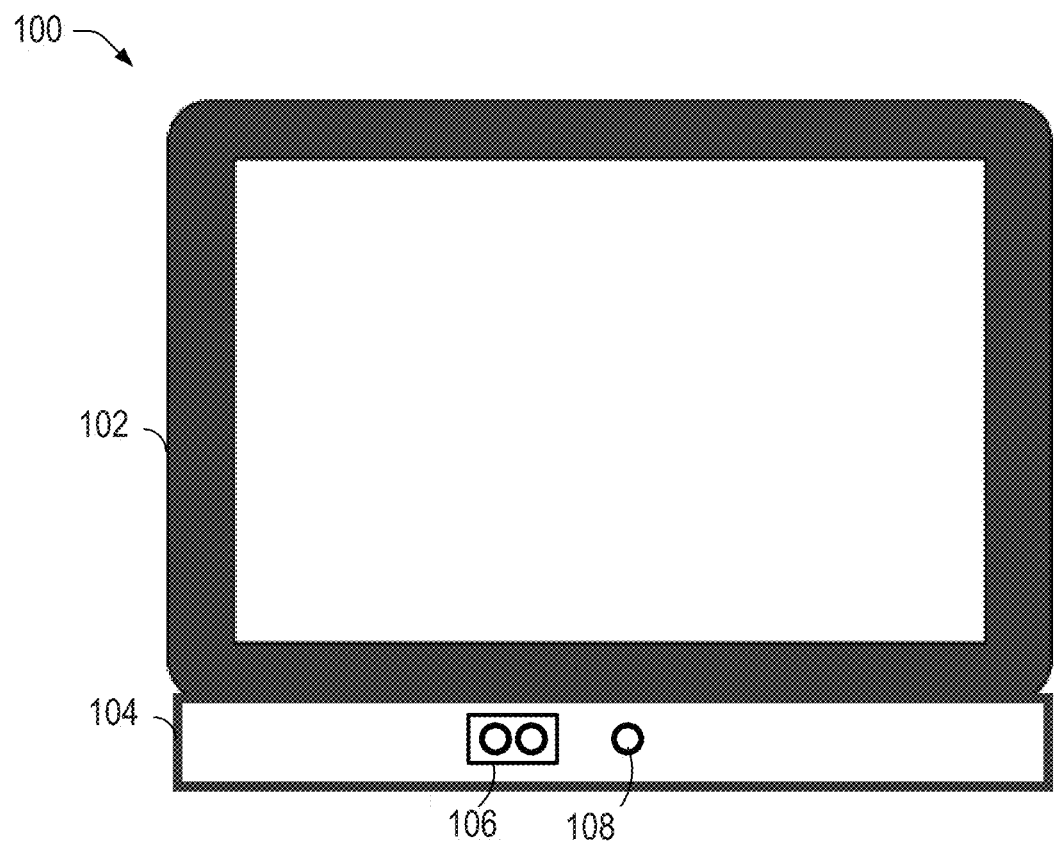
FIG. 1 is a device diagram of an example computing device coupled to a docking device capable of dynamic eye tracking calibration, according to some example embodiments.

Example systems and methods for dynamic eye tracking calibration are described. In the following description, for purposes of explanation, numerous specific details are set forth in order to provide a thorough understanding of example embodiments. It will be evident, however, to one skilled in the art that the present technology may be practiced without these specific details.

A user of a computing device may interact with—and control objects and applications displayed on—the computing device through the user's eye movement. An image of the user's eyes or face, captured by a camera on the computing device or on a device coupled to the computing device, may be analyzed using computer-vision algorithms, such as eye tracking and gaze detection algorithms. For example, the captured images may be processed to extract information relating to features of the user's eyes or face. The computing device may then use the extracted information to determine the location and orientation of the user's eyes and estimate a gaze location of the user. The gaze location of a user is an estimation of where the user is looking (e.g., a location in three-dimensional (3-D) space relative to the user and at which the user is looking) and may include information such as a user's line of sight, point of regard, the depth of convergence of the user's gaze, or any suitable combination thereof.

A user calibration process may be performed by the computing device when the user begins using the computing device in order to calculate calibration parameters associated with the user. These calibration parameters may be taken into account to accurately determine the location of the user's eyes and estimate the distance from the user at which the user is looking. The calibration parameters may also be taken into account to determine the direction of the gaze for each eye of the user as a 3-D vector in space (e.g., a vector that represents the user's line of sight). In such case, information about the hardware geometry may be used, such as camera parameters, location of screen with respect to the camera, and the like.

During use of the computing device, events may occur that affect the calibration of the gaze detector. For example, the user's position relative to the gaze detectors may change, the lighting may change, or other events may occur. Dynamic calibration techniques may be used to improve the calibration of the eye tracking system, to compensate for changes that adversely affect the calibration of the eye tracking system, to detect calibration problems, or any suitable combination thereof.

A standard user calibration process comprises a dedicated user interface (UI) displaying a sequence of calibration objects, typically circles, on different locations of the screen. The user is instructed to look at these calibration objects as they are displayed. While calibration objects are displayed, eye information is captured by the eye tracking software, including pupil center, pupil ellipse, corneal reflections, eye corners, face orientation, and the like. This information can be used to compute the calibration parameters specific to the user, which may include vertical and horizontal offset between optical and visual axes, cornea radius, distance between cornea center and pupil center, coefficients of a mapping function, and the like. For instance, the following mapping functions may be used to map eye features such as pupil center and corneal reflection to a point of regard (x,y) on a screen:

$$x = a_0 + a_1 * vd_x + a_2 * vd_y + a_3 * vd_x^2 + a_4 * vd_x * vd_y + a_5 * vd_y^2$$

$$y = b_0 + b_1 * vd_x + b_2 * vd_y + b_3 * vd_x^2 + b_4 * vd_x * vd_y + b_5 * vd_y^2$$

where $vd_x$ and $vd_y$ are the x and y components of a vector difference between pupil center and corneal reflection on a given image, and $a_{0-5}$ and $b_{0-5}$ are coefficients to be computed through a calibration process, Any suitable calibration process may be used to calculate the calibration parameters specific to the user. Calibration parameters may then be used in combination with the eye information to compute the user's point of regard on a screen or surface and the user's line of sight in 3-D.

The calibration process described may be tedious for the user. Furthermore, the calibration parameters computed may only be valid for the conditions under which the user conducted the calibration. For instance, if the user or the device moves or the illumination conditions in the environment change, the calibration parameters may not provide a good accuracy, and the user may need to conduct a new calibration process.

In some example embodiments, a dynamic calibration process takes place in the background while the user uses the device and interacts with different UI elements, such as menu items, buttons, links, controls, and the like. The eye tracking system may know the location and properties of the interactive elements the user interacts with, and use this information in combination with the eye information collected while the user looks at said interactive elements to update and adjust one or more of the calibration parameters. The eye information collected includes gaze fixations. Each gaze fixation has a location measured by the eye tracking system and a time at which the gaze fixation occurred.

In some embodiments, if two or more interactive elements are displayed at any given time, the system may identify which one the user is looking at by, for example, comparing the distance between gaze location and the locations of the interactive elements, or by comparing the path followed by the interactive elements with the path followed by the eyes as they look at said elements.

In some example embodiments, this calibration process is automatically conducted when the user initially uses the eye tracking functionality. In other example embodiments, the calibration process is performed only at the request of the user. In still other example embodiments, the calibration process is performed whenever poor calibration is detected. In yet other example embodiments, the calibration process is performed automatically in the background while the user uses a device and interacts with certain interactive elements. For instance, the user may be setting up the device for the first time, and while doing so the eye tracking software may calibrate.

Gaze information gathered during a calibration process may be stored in a calibration data structure. The calibration data structure may store one or more elements of data for each gaze capture. For example, the pupil center, pupil ellipse, corneal reflections, eye corners, and face orientation may each be stored. In some example embodiments, a time stamp for the gaze information is stored as well. The calibration data structure may be used in the calibration process. For example, as eye features are detected for each calibration object, data may be added to the calibration data structure. When the number of gaze captures is sufficient to compute the calibration parameters, the stored data may be used for calibration. The calibration data structure may be stored for later use. For example, if the same user returns to the device, the previously-stored calibration data structure may be used as an initial guess of calibration data for the user. Similarly, if additional calibration data is gathered, it can be added to the calibration data structure and recalibration performed using the updated calibration data structure.

In some embodiments, the calibration parameters may be reset when the system detects a new user. For instance, if the system uses facial or iris recognition and detects the presence of a different user, the calibration parameters may be automatically updated to those corresponding to said user, if said calibration parameters have been previously computed and stored. If no calibration parameters exist for said new user, the calibration parameters may be reset and a new calibration process may be initiated by the eye tracking system to compute the calibration parameters that are suitable to said new user. In some embodiments, said calibration process may be transparent to the user.

In some example embodiments, detected gaze locations are correlated (e.g., by the computing device) with actions performed by the user and compared with typical gaze locations for those actions. Based on differences between the detected and expected gaze locations, the eye tracking system can be recalibrated (e.g., by the computing device). For example, a user may be expected to look at a button or link within the second before clicking or touching it. If the user's gaze is instead detected as looking at a position above or below the button or link, the vertical component of the calibration can be adjusted (e.g., by the computing device).

When multiple active locations are in proximity to each other, it may be difficult or impossible to resolve a gaze location as being directed to any particular one of the active locations. When the desired active location is difficult to determine, detecting a user action may be redirected toward resolving the ambiguity. For example, an area around the gaze location encompassing the likely active locations can be enlarged (e.g., by the computing device), effectively prompting the user to interact with the desired active location again. The enlarging of the area may have the effect of separating the active locations on the screen, thereby reducing the probability of interpreting the user's gaze incorrectly.

FIG. 1 is a device diagram of an example combined device 100 comprising a computing device 102 coupled to a docking device 104 capable of facilitating eye tracking control and calibration thereof. While eye tracking control is described throughout the description, one of ordinary skill in the art will appreciate that the example computing device 102 may be used passively to record the eye movement of a user without the user controlling the computing device 102 with the eyes (e.g., to facilitate a usability study). Eye tracking control refers to the control of a device, or software running on a device, based on tracking the eye activity of a user. For example, based on the position or motion of a user's eyes, objects on a screen can be moved, text can be input, visibility attributes can be modified, user interfaces can be interacted with, and so on. A visibility attribute is any attribute that can affect the visibility of a screen or display or any item or object on the screen or display. Example visibility attributes include transparency, translucency, opacity, contrast, brightness, size, color, and so on. The computing device 102 may be any type of computing device, including, but not limited to, a smart phone, a personal digital assistant (PDA), a mobile phone, a computing tablet, an electronic reader, a television, a laptop, a desktop computer, a display device, a head-mounted display, and the like. During eye tracking control, the computing device 102 may be used by the user by holding the computing device 102 with one hand, both hands, or while the computing device 102 is on a stand or resting on a surface. In some example embodiments, the computing device 102 is mounted in a vehicle (e.g., a car, boat, or aircraft).

The docking device 104 may be coupled to the computing device 102 in any manner, such as through a universal serial bus (USB) port on the computing device 102, micro USB port on the computing device 102, and the like. While the docking device 104 of FIG. 1 is depicted at the bottom of the computing device 102, one of ordinary skill in the art will appreciate that the docking device 104 may be located at any suitable location relative to the computing device 102, and may be attached (e.g., connected via a direct electrical connector) or unattached (e.g., communicating over Bluetooth or a wireless network). The docking device 104 may include a camera module 108 and one or more light-emitting diodes (LEDs) 106. For explanatory purposes, the discussion herein will continue to refer to the LEDs 106. However, any appropriate light-emitting source may be used (e.g., an infrared (IR) laser) in place of one or more of the LEDs 106.

The docking device 104 may include any number of infrared LEDs 106 that may be placed in a suitable location in any manner within the docking device 104 (e.g., tilted at an angle such that it points toward the user's face). In some example embodiments, the one or more LEDs 106 may be synchronized with the one or more cameras in such a manner that the one or more LEDs are turned on when the one or more cameras are grabbing a frame, and turned off otherwise. In some example embodiments, the LEDs may be turned off if no movement has been detected or if the docking device 104 or computing device 102 go into a sleep mode.

In other embodiments, the camera module 108 may be integrated with the computing device 102. For instance, one or more front-facing cameras in a computing device may be used as camera module 108. In other embodiments, the LEDs 106 may be integrated with the computing device 102. In other embodiments, the LEDs 106 and the camera module 108 may be integrated with the computing device 102.

In some embodiments, the computing device 102, the LEDs 106 and the camera module 108 may be integrated into a vehicle or appliance (e.g. a refrigerator, a television, a gaming console, and the like).

The eye tracking control software may analyze the images taken by the camera module 108 to provide coordinates (x, y) relative to the screen indicating where the user is looking on the display of the computing device 102. These coordinates may be used for any number of applications (e.g., scrolling, moving objects, selecting icons, playing games, collecting data for analysis, etc.).

Figure 2:
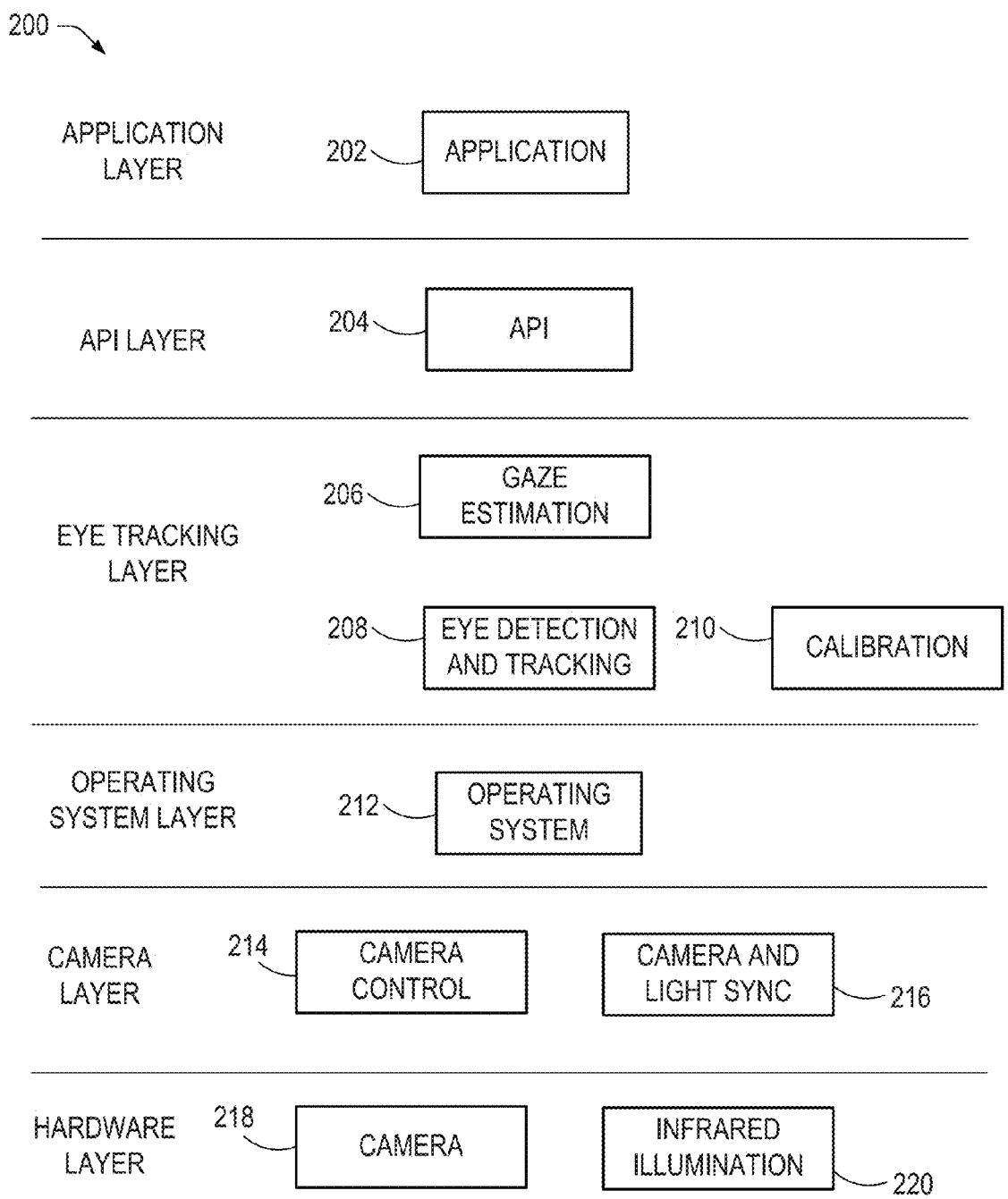
FIG. 2 is a block diagram of an example system architecture for dynamic eye tracking calibration, according to some example embodiments.

FIG. 2 is a block diagram of an example system architecture 200 for facilitating eye tracking control and calibration thereof. Any one or more of the components 202-220 of the system architecture 200 may be implemented using hardware modules (e.g., a properly-configured central processing unit (CPU) of the computing device or a combination of a CPU and a graphics processing unit (GPU) of the computing device). In some example embodiments, any one or more of the components 202-220 of the system architecture 200 may include software running on a dedicated chip. The software may run as a background process (e.g., as part of the operating system (OS), in a web browser, etc.) and may provide an application programming interface (API) 204 that other applications can access. The API 204 may send an alert (e.g., raise an event) or use some other similar mechanism to send the gaze information to other applications.

The system architecture 200 may be divided into different layers. The hardware layer may include a camera module 218 and an infrared illumination module 220 that may correspond to the respective hardware (e.g., the camera, the infrared illumination, etc.). A camera layer may include a camera control module 214 that may be in charge of communicating with the one or more cameras in order to perform camera operations such as, for example, starting the camera, grabbing images, controlling the camera properties, and the like. This layer may also include a camera and light sync module 216, which may synchronize the one or more cameras and the infrared emitters so that the lights are turned on by the eye tracking software in order to improve tracking of the user's eyes and minimize energy consumption. In some example embodiments, the camera layer may be configured to strobe the infrared LEDs at the frequency of the camera trigger output. In other example embodiments, LEDs are turned on selectively by the eye tracking software in order to optimize image quality (e.g., certain LEDs may be turned off to avoid reflections on a user's glasses).

The camera layer may deliver images to the eye tracking layer. In the eye tracking layer, an eye detection and tracking module 208 may process images to find features like face location, eye region location, pupil center, pupil size, location of the corneal reflections, eye corners, iris center, iris size, and the like. These features may be used by the gaze estimation module 206 in the gaze estimation stage, which may be in charge of calculating the point of regard or the line of sight of the user using the features computed by the eye detection and tracking module 208. The point of regard of the user may be a location on the display where the user is looking, a location on another plane where the user is looking, a three-dimensional point where the user is looking, or a plane where the user is looking. The gaze estimation module 206 may also calculate specific features of the user's eyes, such as optical and visual axes, locations of the cornea center and pupil in 3-D space, and so forth. These features may also be employed to compute the point of regard on a given display or plane.

The calibration module 210 correlates information reported by the gaze estimation module 206 and the eye detection and tracking module 208 with expected gaze locations of the user to compute different parameters that may be user specific. For instance, calibration parameters may include offset between optical and visual axes, distance between cornea center and pupil plane, coefficients of mapping functions, and the like. These calibrations parameters may be used in combination with the features computed by the eye tracking module 208 and the gaze estimation module 206 to compute the point of regard of the user. In some embodiments, the gaze estimation module 206 may compute an estimation of the point of regard or the line of sight of the user prior to the user being calibrated. The calibration module 210 may also create visual elements for a user to interact with (e.g., to look at), causing the elements (e.g., targets) to be displayed at particular locations. Differences between the gaze location reported by the gaze estimation module 206 and the known location of a displayed target can be used by the calibration module 210 to adjust and correct the calibration parameters used by the gaze estimation module 206 to compute gaze coordinates. In some embodiments, said visual elements may be created by an application 202 or by the operating system 212, which may inform the calibration module 210 via the API 204 when the elements are displayed, selected by the user, gazed upon by the user, their size and location, etc.

The API layer may be used for communication between the eye tracking layer and applications 202 that use eye gaze information (e.g., the OS layer or games that employ eye gaze information). Though the OS 212 is shown in FIG. 2 as intermediating between the eye tracking layer and the hardware layer, in some example embodiments, the relative positions are reversed and the eye tracking layer intermediates between the OS 212 and the camera layer. An API 204 may send data calculated by the eye tracking layer, such as coordinates of the point of regard, 3-D location of the user's eyes, pupil size, distance between the eyes, head orientation, head movement, and the like. The API 204 may also accept commands from an application to the eye tracking layer (e.g., to start or stop the eye tracking engine, query for specific information, inform the engine of the location and size of visual elements the user may look at, or any suitable combination thereof). An application module 202 and the OS 212 may connect to the eye tracker's API 204 and use eye gaze information for any suitable purpose (e.g., control an application or a game, record eye data for visual behavior studies, adjust the transparency of information on a screen, or any suitable combination thereof).

Figure 3:
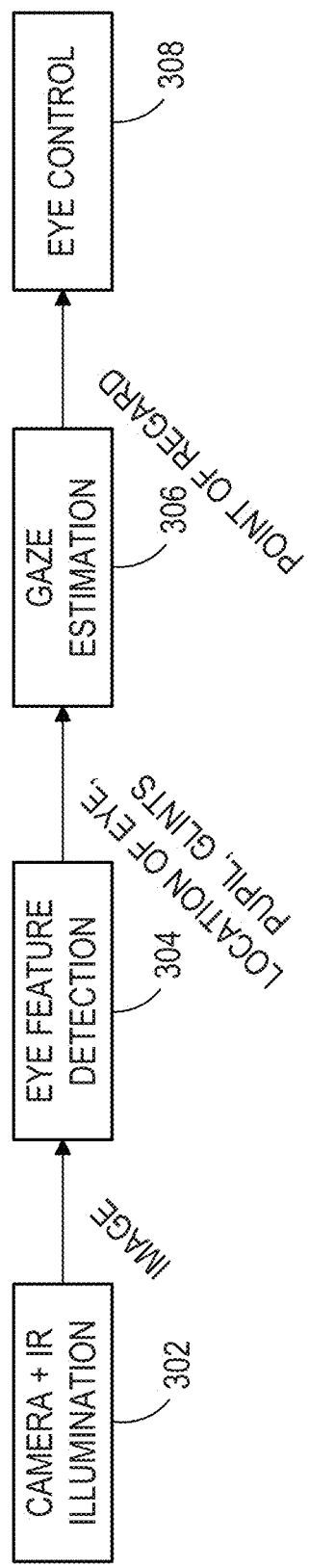
FIG. 3 is a block diagram of an example flow of data used in dynamic eye tracking calibration, according to some example embodiments.

FIG. 3 is a block diagram of an example flow of data used to facilitate eye tracking control and calibration thereof. The camera and infrared illumination module 302 may capture an image of the user using one or more cameras, ambient light, emitted visible light, emitted infrared light, or any suitable combination thereof. The eye feature detection module 304 may use the captured image data to detect eye features (e.g., location and orientation of eyes, pupils, irises, corneal reflections, or any suitable combination thereof). Using the detected eye features, the gaze estimation module 306 may estimate the user's point of regard or line of sight, which may then be used to control aspects of an application through the eye control module 308.

Figure 4A:
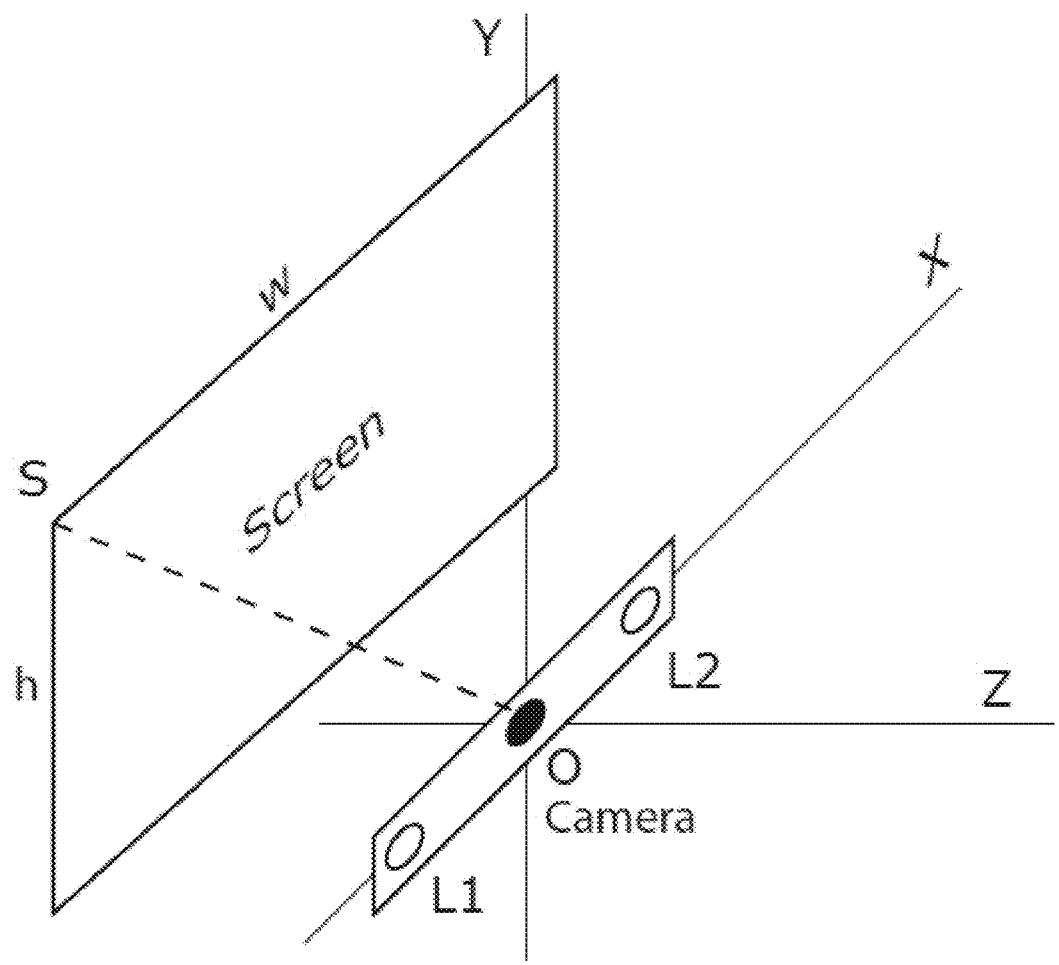
FIGS. 4A-4B are schematic diagrams depicting eye tracking technology relative to a display, according to some embodiments.
Figure 4B:
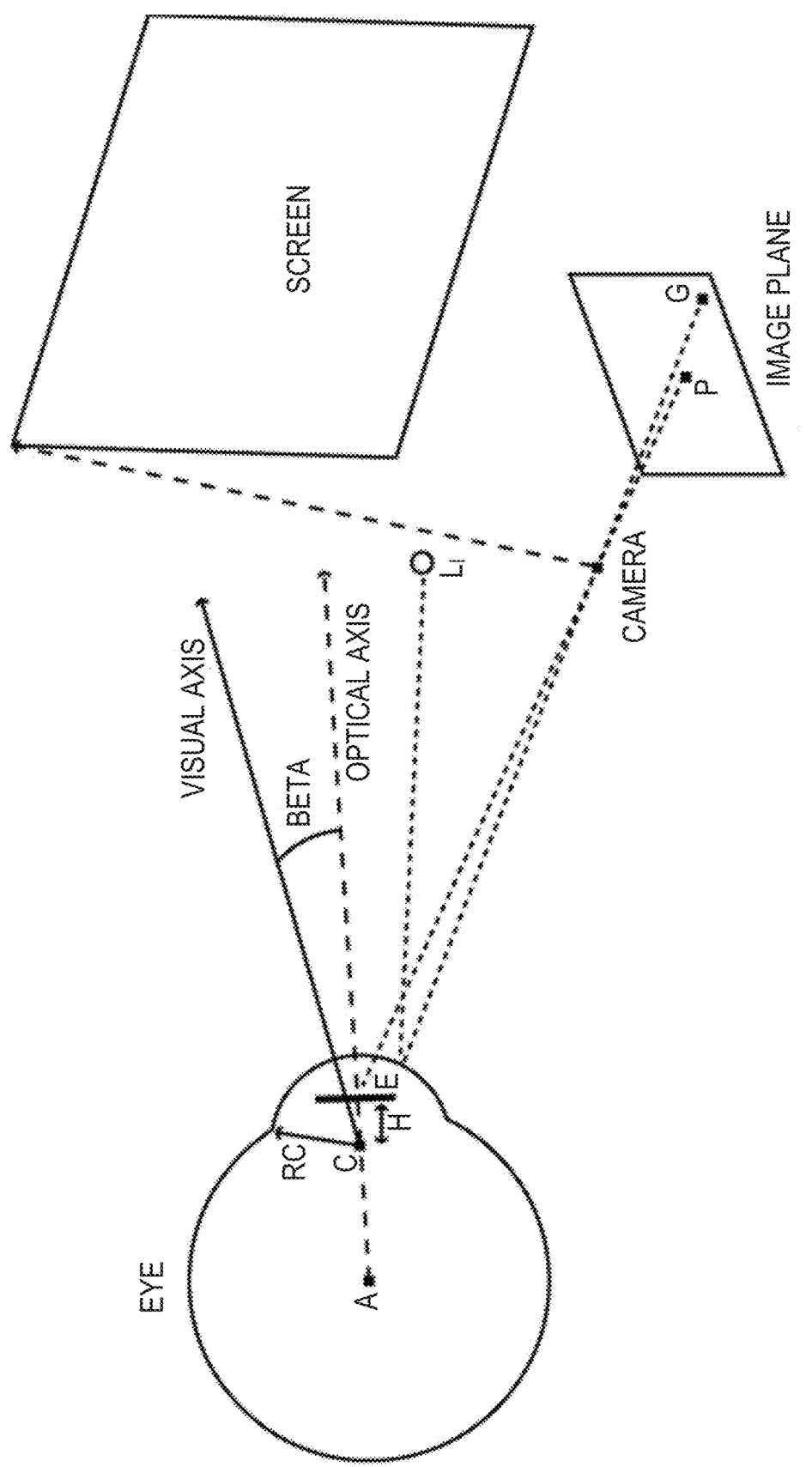

FIGS. 4A and 4B are schematic diagrams depicting eye tracking technology relative to a display. In FIG. 4A, O is the center of the coordinate system XYZ, and $L_{1-n}$ are light sources. In some embodiments, the location of the one or more cameras and the one or more light sources $L_{1-n}$ with respect to O is known. In some embodiments, the location of the screen S with respect to O is known. In some embodiments, some camera parameters are known, including focal length, optical center, and the like.

In some embodiments, an eye tracking system is built into a screen or is mounted in a specific location on the screen, as described above. In some other embodiments, the components of the eye tracking system (e.g., the one or more cameras and the one or more light sources) are integrated into another element such as a car dashboard, a head mounted display, or a helmet.

The eye tracking system may capture information regarding the eye and face features of the user, including pupil center, pupil ellipse, corneal reflections, eye corners, face orientation, and the like. The pupil center is the point at the center of the detected pupil. A pupil ellipse is the elliptical representation in an image of a (circular) pupil. The eccentricity of the pupil ellipse is related to the angle between the direction of the user's gaze and the line from the camera to the eye. Corneal reflections are reflected light from the cornea. When the relationship between the light source L and the camera O is known, the position of corneal reflections of the light source, as measured relative to the pupil center, can be used to identify the gaze direction.

FIG. 4B illustrates eye features to be calculated in 3-D space with respect to the origin O such that the visual axis may be computed and intersected with the display plane. The location of the corneal reflections on the image plane, g, can be used in combination with the location of the light sources in 3-D space, L, with respect to the one or more cameras and the intrinsic parameters of the cameras to calculate the location of the cornea center in 3-D space, C. For example, a ray can be traced from each light source L to each camera via the cornea. Each light source camera pair provides a separate ray and identifies a point on the surface of the cornea. By triangulating between these points, both the corneal radius and the location of C can be determined. When more cameras or light sources are used, the accuracy of the measurement can be increased.

The location of the pupil center on the image plane, p, can be used in combination with the location of the cornea center in 3-D space, C, the optical properties of the eye and air, and the intrinsic parameters of the cameras to calculate the location of the pupil center in 3-D space, E. For example, the camera captures an image of the pupil, but the actual position of the center of the cornea differs from the position directly indicated by the image because the pupil lies behind the cornea and light is refracted at the juncture between the cornea and the air. Accordingly, the apparent position of the pupil center is adjusted to take this refraction into account.

The location of the pupil center E and the location of the cornea center C in 3-D space define a vector, called the optical axis. The actual line of sight, which may also be known as visual axis, has an angular offset with respect to the optical axis, known as alpha and beta, which are usually around 5° horizontally and 1.5° vertically. Alpha and beta may take different values for each person, and therefore may be computed on a per-user basis.

Both alpha and beta can be computed via a calibration process, which may take place explicitly or implicitly while the user is interacting with certain visual elements on a computing device.

Once the visual axis is known, the ray can be intersected with the screen plane. The intersection provides the on-screen gaze coordinates where the user is looking. Other eye parameters like the corneal radius or the distance between pupil center and corneal center can also be calculated during the user calibration process to improve the accuracy of the computation of on-screen gaze coordinates (due to a better estimation of the cornea center and hence optical and visual axes). Otherwise, average values can be used (e.g., 7.8 mm for the corneal radius).

The total set of unknowns to be calibrated during said user calibration may include any unknown information, such as eye parameters (e.g., offset between optical and visual axes alpha and beta, corneal radius Rc, distance between pupil center and cornea center h, refraction indices n, etc.) and hardware parameters (e.g., screen location and orientation with respect to location of eye tracking device in 3-D space S, and screen size (width w, height h)). The information known prior to calibration may include a location of a light source with respect to the one or more cameras L1-Ln, camera parameters of the one or more cameras (e.g., focal length, optical center, etc.), and the like.

In some example embodiments, the screen size (w, h) may be known or may be obtained programmatically through software (e.g., through an operating system API) and used as prior known information. In some embodiments, some of the eye parameters may take constant values to reduce the dimensional space of the unknowns.

Figure 5:
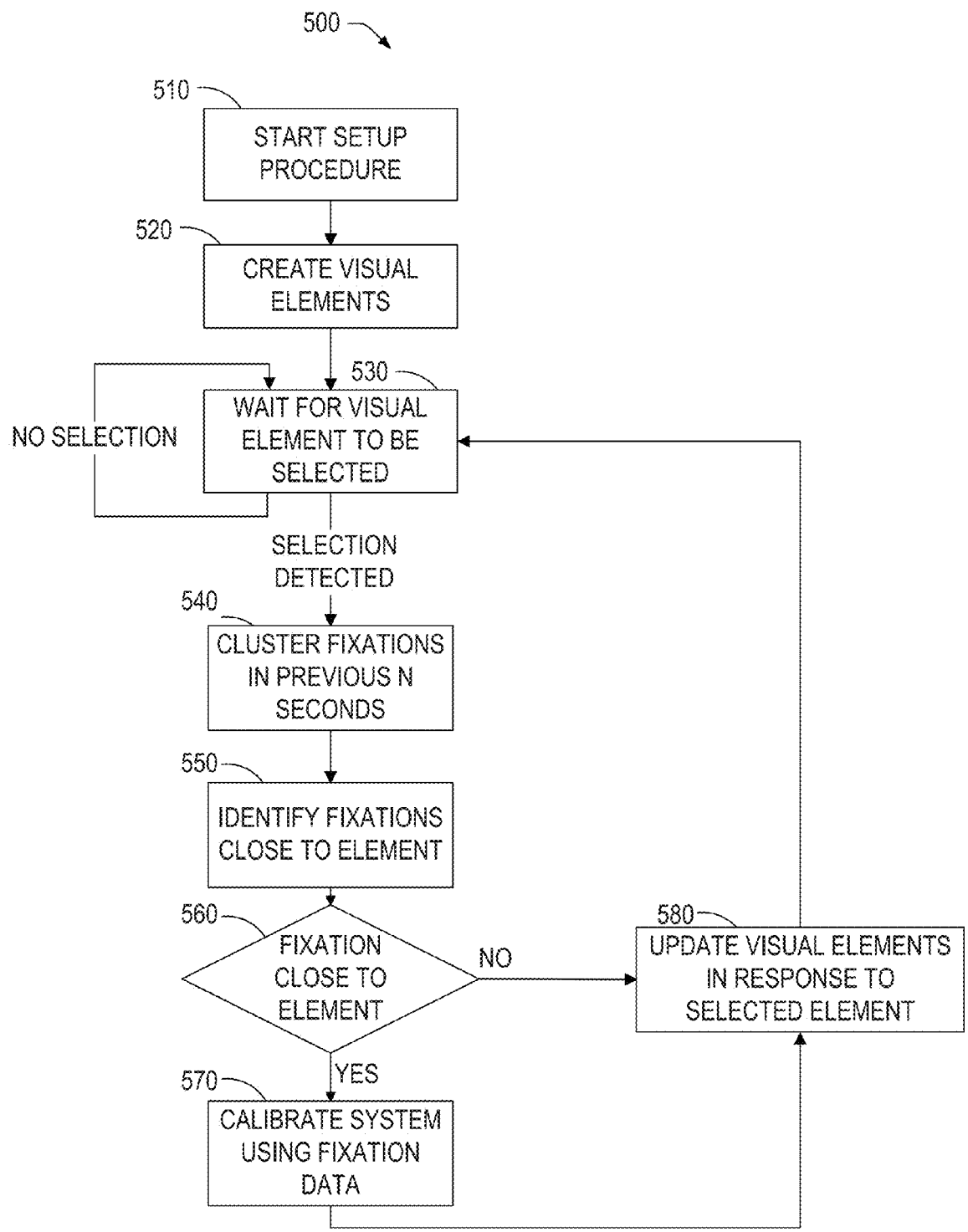
FIG. 5 is a flowchart of an example method of eye tracking calibration, according to some example embodiments.

FIG. 5 is a flowchart of an example process 500 of eye tracking calibration, according to some example embodiments. Operations 510-580 of the process 500 are described as being performed by the components or modules shown in FIG. 2, by way of example and not limitation.

In operation 510, a setup procedure is initiated on a device. The setup procedure may be initiated by a user of the device, an application of the device (e.g., the application 202), an OS of the device (e.g., the OS 212), or any suitable combination thereof. For example, the operating system 212 of the device may initiate the setup procedure the first time a device is used, after the device is moved to a new location, when an application is restarted, when a new user is detected by the system, when a game is launched, or under other circumstances. The user may be given the option to run or re-run the setup procedure as well.

One or more interactive elements are created for selection by the user (operation 520) by the application 202. Each element is displayed on the screen at a corresponding location. These elements may include buttons, links, checkboxes, radio buttons, lists, drop-down menus, and the like.

The application 202 waits for an element to be selected by the user, in operation 530. Once a selection is detected, the application may inform the calibration module 210 of the element being selected, the location of the element, properties of the element, or any suitable combination thereof. In another embodiment, this information may be provided to calibration module 210 by the OS 212.

In operation 540, the calibration module 210 clusters the gaze fixations of the user detected in the previous N seconds (e.g., 1 second, 5 seconds, or another period of time). For example, gaze information of the user can be stored in a buffer (e.g., a database) that spans N seconds. The buffer can be maintained indefinitely or older gaze information can be deleted as the time elapsed exceeds the threshold used for clustering (e.g., deleted after N seconds pass). The locations at which the user gazed during the time period prior to the selection of an element, as identified by the gaze estimation module 206, may be clustered using k-means, mean shift, expectation-maximization, or any suitable combination thereof.

The cluster of fixations closest to the selected element is identified by the calibration module 210 (operation 550). Different quality metrics may be used to identify the correct cluster, such as distance between center of cluster and center of the selected element, number of samples in the cluster, intra-cluster coherence (e.g. covariance, fractal distance, or any suitable combination thereof). If no fixation cluster is identified to be close to the selected element (operation 560), the calibration module 210 may discard the information gathered prior to the selection of the element and proceed to operation 580.

In operation 570, the calibration module 210 adjusts the calibration using the gaze information corresponding to the samples that belong to the identified cluster. In some example embodiments, the gaze information is added to a calibration data structure containing gaze information that correspond to previous selections, and the system is calibrated using the information available in said data structure. Once the new calibration parameters have been computed using the new information, the system may compare the quality of the new calibration with the previous stored calibration, if any, and accept or reject the new calibration based on different metrics, e.g., accuracy, standard deviation, and so forth. In some example embodiments, a quality metric is computed periodically for each calibration in the calibration data and low-quality calibrations are removed from the calibration data.

In some embodiments, the system deletes entries from the calibration data structure in order to keep a constant number of data points used to recalibrate the system. For example, once a threshold number of data points is exceeded, each new data point gathered may trigger the deletion of the oldest data point. In this example, the quality metric is based on the number of data points stored and the time at which each data point was gathered.

In some example embodiments, the system deletes entries from the calibration data in order to maintain only data points obtained with a certain recency. For example, data points over ten minutes old may be deleted. In this example, the quality metric is based on the time at which each data point was gathered.

As another example, the system may delete entries from the calibration data structure in order to reduce overlap between stored entries. For example, if new calibration data is gathered that relates to a user interaction with a certain location on the screen, old calibration data that relates to a user interaction with the same location (or a location within a threshold distance of that location) may be deleted. Said deletion may also be based on distance to other elements, gaze estimation error, or any suitable combination thereof.

In some example embodiments, the eye tracking system informs the application that a new calibration has been performed. In some example embodiments, the eye tracking system sends the calibration results (e.g., accuracy, standard deviation, error for all entries in the calibration data structure used in the computation of the calibration parameters, and the like).

In some example embodiments, the eye tracking system makes a determination as to whether to accept or reject the newly gathered data. For example, calibration may be performed by minimizing an error measure between calculated gaze position and location of an interactive object interacted with by the user at a nearby point in time. Recalibration using the new data may affect the error measure of previously-gathered gaze information. When the increase in error exceeds a threshold, the newly gathered data may be discarded. For example, if the user was not looking at the point of interaction at the time of interaction, recalibration based on an assumed correlation between the gaze information and the interactive object would likely increase the error to a degree sufficient to indicate that the newly-gathered data was unreliable.

In operation 580, the application 202 updates the interface and its visual elements according to the functionality of the element selected by the user. For instance, if the visual element selected by the user is a "Next" button, the application may update the interface and display the next screen in the setup procedure. In some embodiments, the application may use the calibration results provided by the eye tracking system after each successful computation of the calibration parameters to adapt the interface in order to obtain a better calibration quality. In some embodiments, operation 580 occurs after a selection has been detected in operation 530, and the application updates the interface in response to the selection while the eye tracking system performs operations 540-570.

The calibration process 500 terminates once the user has completed the setup procedure. In some embodiments, the application may modify the setup procedure in order to improve the calibration quality of the user. For instance, the layout of certain visual elements may be modified based on the current calibration quality of the user. In some example embodiments, once the calibration quality is above a given threshold, the application may give the user the option to use eye control for the remainder of the setup procedure.

Figure 6A:
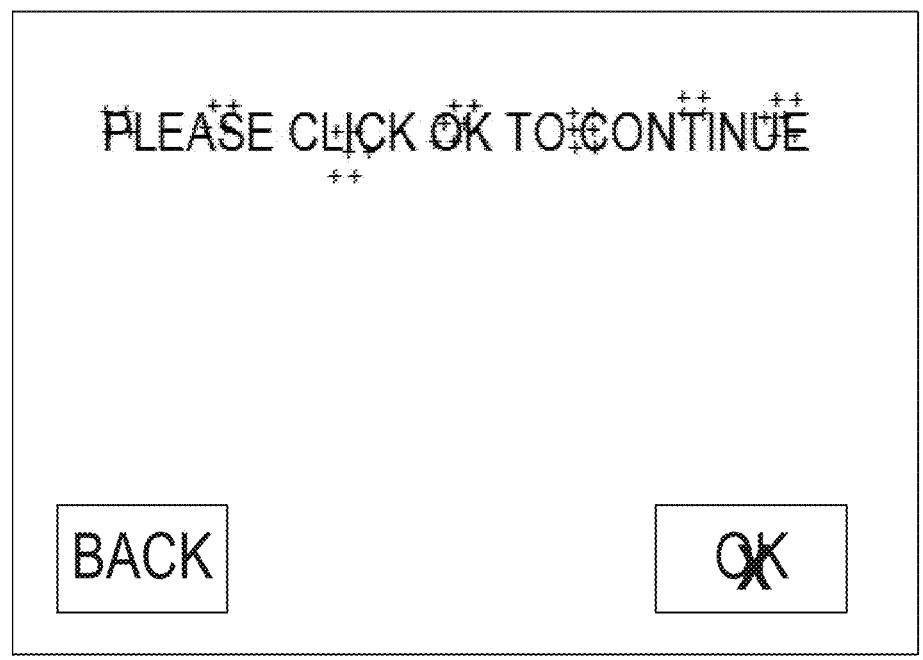
FIGS. 6A-6B are illustrations of example gaze samples and clusters generated therefrom.
Figure 6B:
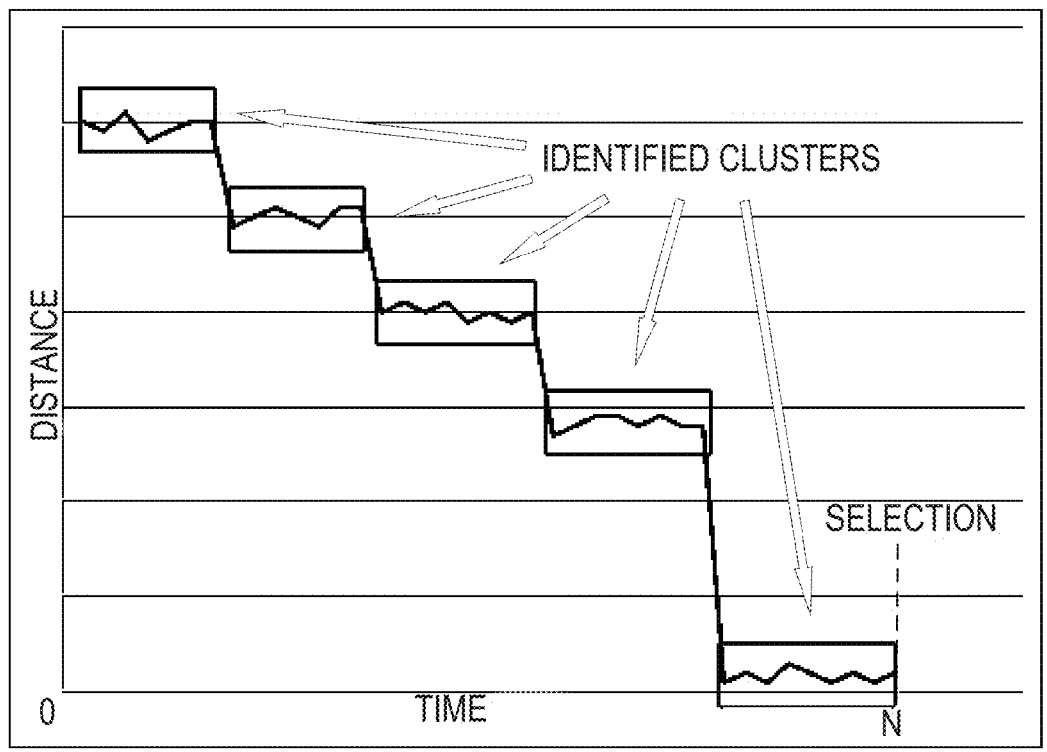

FIG. 6A shows an example user interface with prior gaze fixations shown with blue "+" markers. With reference to the process 500, described above, the button labeled "OK" may have been selected by the user, as indicated by the red "x" marker, and the marked locations may correspond to the fixations in the previous N seconds addressed in operation 540. FIG. 6B shows a set of 5 identified clusters corresponding to the gaze fixations in FIG. 6A. The gaze samples are clustered according to their temporal and spatial characteristics, forming a series of clusters. The cluster closest to the interactive element selected by the user is then identified by different criteria, such as distance, time, number of samples in the cluster, intra-cluster coherence, or any suitable combination thereof. The graph line shows the distance of the user's gaze fixation point from the point of interaction as a function of time, with the right-hand edge of the graph corresponding to the time at which the selection of the "OK" button was made. Accordingly, the right-most cluster, outlined with a red box, corresponds to the fixation points on the "OK" button just before the button was selected. The remaining clusters correspond to fixation points farther away from the "OK" button. By inspection of FIG. 6A, those clusters correspond to various locations in the text, "Please click OK to continue."

Figure 7:
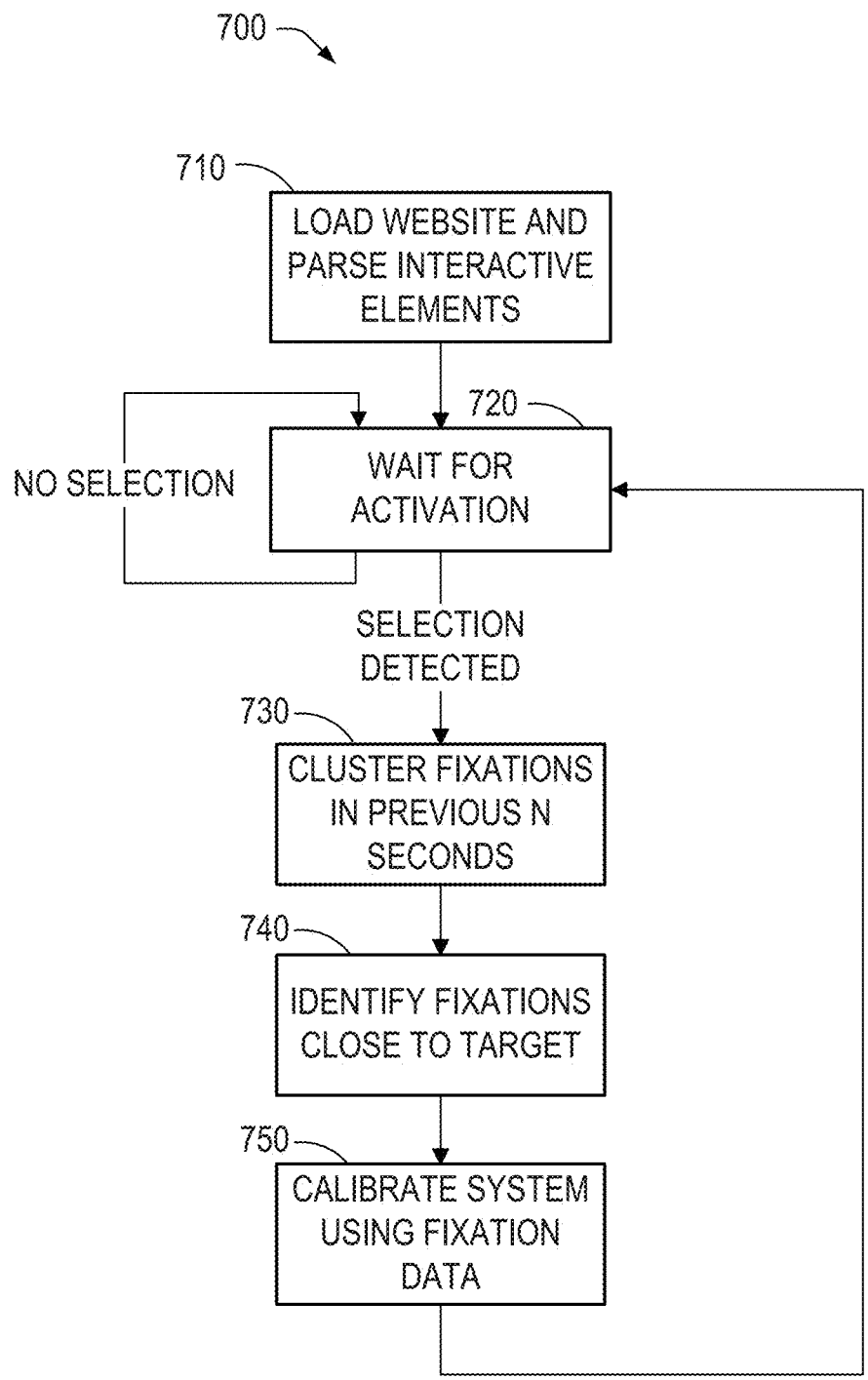
FIG. 7 is a flowchart of an example method of dynamic eye tracking calibration, according to some example embodiments.

FIG. 7 is a flowchart of an example process 700 of dynamic eye tracking calibration, according to some example embodiments. Operations 710-750 of the process 700 are described as being performed by the components or modules shown in FIG. 2, by way of example and not limitation. Similarly, the process 700 is described with respect to a web browser showing a web page, but may be used with other interactive applications.

In operation 710, a page of a web site is loaded and displayed (e.g., by a web browser application 202). In some example embodiments, the application 202 may identify the locations and sizes of all the interactive elements and pass them to the calibration module 210. The interactive elements are the elements capable of receiving input from a user (e.g., links, buttons, text fields, checkboxes, address bar, menu items, and so on). In some example embodiments, the application 202 only passes the location of the elements which with the user interacts to the calibration module 210 (e.g., via the API 204). In some example embodiments, the calibration module 210 accesses the web page and parses the page to identify locations of interactive elements of the page.

In operation 720, the application 202 or the calibration module 210 waits for a user activation of an interactive element (e.g., selection of a link, pressing a button, clicking or touching a text field, and so on). Once an activation is detected, the process 700 continues with operation 730. For example, the calibration module 210 can model the displayed web page separate from the application 202, receive a notification from the operating system when a user interaction occurs, and determine that the user interaction location matches the location of a displayed element. As another example, the application 202 can notify the calibration module 210 of the user interaction, the location of the interaction, and the location and size of the activated element via the API 204.

The calibration module 210, in operation 730, clusters the gaze fixations reported by the gaze estimation module 206 over a period of time (e.g., the past 2 seconds, past 5 seconds, or other suitable period). The cluster of gaze fixations closest to the activated object is identified by the calibration module 210 in operation 740. The gaze information corresponding to the samples in the cluster is used by the calibration module 210 to calibrate the system in operation 750. The operation 750 may be performed in a manner similar to the operation 570, described above. The operations 720-750 may be repeated for as long as the interactive application is running.

Figure 8:
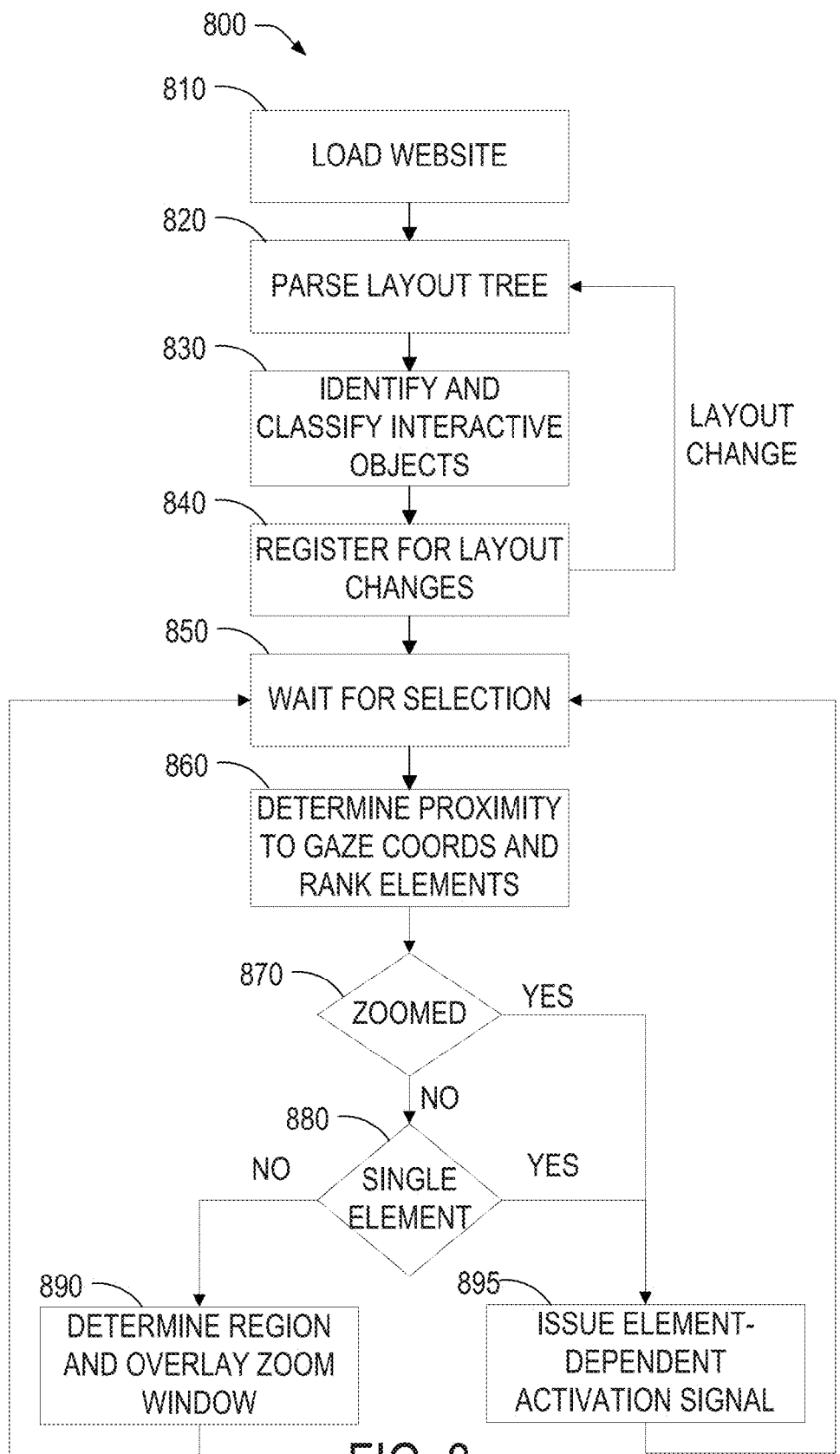
FIG. 8 is a flowchart of an example method of application control using eye tracking, according to some example embodiments.

FIG. 8 is a flowchart of an example process 800 of application control using eye tracking, according to some example embodiments. Operations 810-895 of the process 800 are described as being performed by the components or modules shown in FIG. 2, by way of example and not limitation. Similarly, the process 800 is described with respect to a web browser showing a web page, but may be used with other interactive applications.

In operation 810, a page of a web site is loaded by an application 202. The layout tree of the web page is parsed (operation 820) by the application 202 and interactive objects are identified, localized, and classified (operation 830). The application 202 registers to receive changes in the layout of the web page (operation 840). If the layout of the page is changed (e.g., because the user has adjusted the size of the browser window, or a panel has been displayed after a selection by the user), control returns to operation 820, to parse and update the new layout.

In operation 850, the application 202 waits for a selection (e.g., a selection of a link). The selection may be issued as a combination of gaze input and a physical input (e.g., a key press, a mouse click, a tap on a touchscreen or touchpad, or any suitable combination thereof). When a selection is received, the proximity of interactive elements to the location of the selection is determined, and the probable elements that the user intends to interact with are ranked (operation 860). The interactive elements may be ranked according to a metric based on distance to gaze location, shape of the element, type and styling of the element (e.g. based on cascading style sheets (CSS) or hypertext markup language (HTML) properties), function of the element (e.g. destination of a link, function of a button), relative number of previous interactions of the user with the element, or any combination thereof, such that the elements with a higher probability of being interacted with are ranked higher. Distance may be computed from gaze location to center of the element, to one or more sides of the element, to the closest point in the contour of the element, and the like. In some embodiments, operation 860 may determine if the top ranking element can be selected with a confidence level that is higher than a confidence threshold. In some embodiments, the confidence threshold may be based on the relative distances between the gaze location and the ranked elements, the number of elements, the size, type, and function of the elements, an estimate of the accuracy or noise of the gaze estimate, or any combination thereof. For example, if the calibration accuracy is considered good, the confidence threshold may be higher, and the top ranking element may be selected with a higher confidence. In some embodiments, the estimate of the accuracy is based on an estimate of the accuracy of the gaze estimate in the specific screen location of the interactive element. For example, the system may estimate the accuracy of the gaze estimate in different regions of the screen, such that the top ranking element may be unequivocally selected with higher confidence in areas where the accuracy is better.

A check is made in operation 870 to determine whether the system is in a zoomed state. If it is not in a zoomed state, a check is made in operation 880 to determine whether a single element or multiple elements were detected in operation 860, and whether the top ranking element has been selected with a confidence higher than a confidence threshold. If a single element has been identified, the element is activated (operation 895). This selection may occur even if the gaze location is not within the active area of the element. If multiple elements are found, then a region is determined that encompasses the multiple elements (operation 890). The region is enlarged and displayed to the user as an overlay. The size of the overlay may be based on the accuracy of the gaze estimate and the number and relative position of the multiple elements. For example, a lower accuracy and higher number of elements may result in a larger overlay.

After the overlay is displayed, control of the process returns to operation 850, to wait for another selection.

After another selection is received, in operation 860, ranking the nearby interactive elements is repeated. In some example embodiments, if a zoom window has been overlaid, the most probable element, if any, is activated (operation 895). In other example embodiments, if a zoom window has been overlaid and multiple elements are detected after a new selection, a new zoom window may be overlaid with an increased zoom factor. This may help to resolve the ambiguity due to the inaccuracy of the gaze point and the high density of interactive elements.

In some example embodiments, the application 202 receives the selections and performs the operations 860-895. In other example embodiments, the eye tracking layer handles the proximity detection and the API 204 reports appropriate commands to the application 202. For example, when multiple elements are close to the selection location, a command to zoom in may be sent to the application 202 instead of a command to interact with an element.

Figure 9:
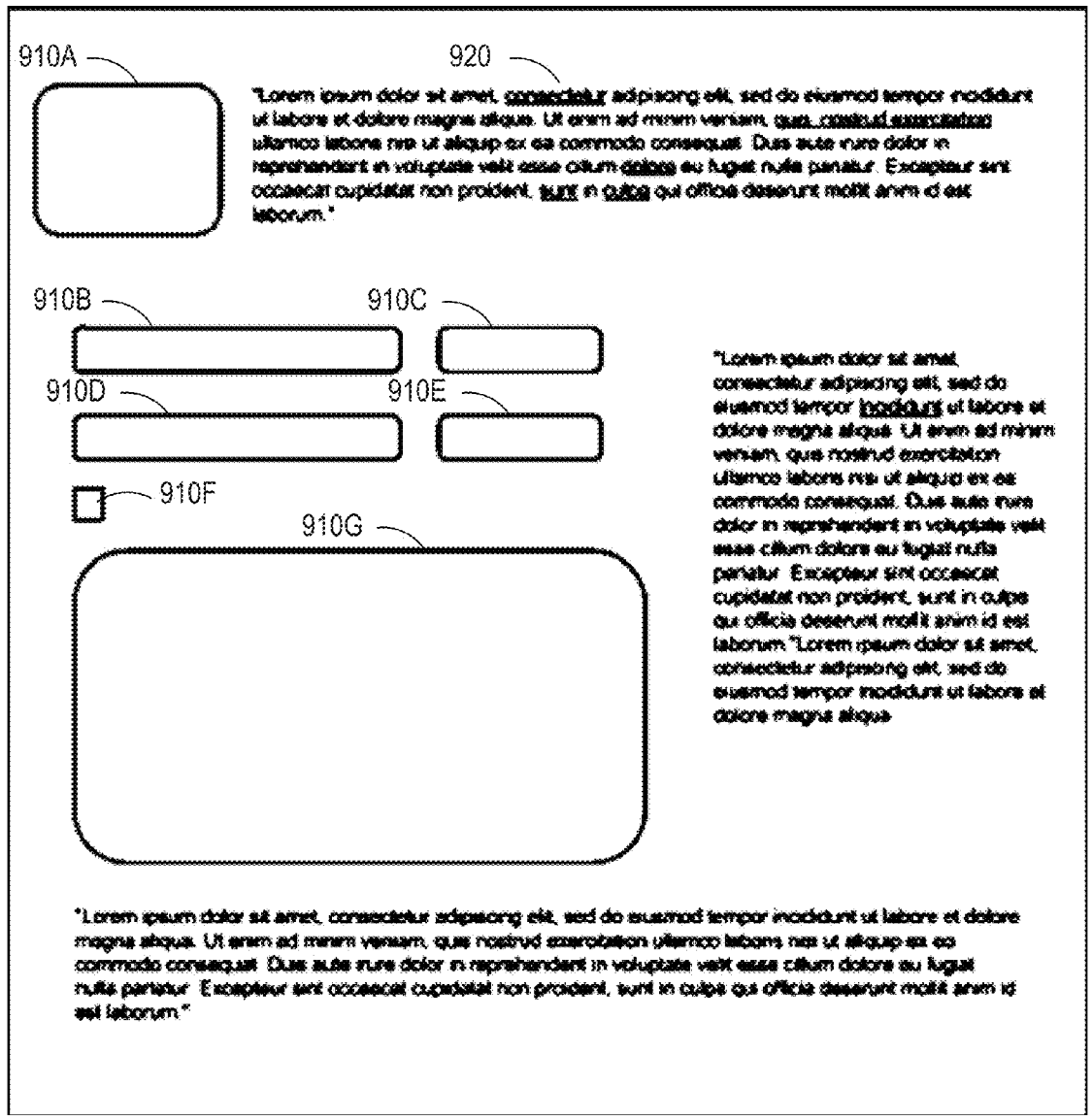
FIG. 9 is a screen diagram illustrating an example display screen with active elements highlighted, shown in reference to some example embodiments.

FIG. 9 is a screen diagram illustrating an example display screen with active elements labeled or underlined, shown in reference to some example embodiments. Elements 910A-910G are associated with areas of the screen. For example, element 910A may be a logo operable to return to a home page. Similarly, elements 910B-910E may be drop-down menus; element 910F may be a checkbox; and element 910G may be a text entry field. In each case, the element 910 can be interacted with by the user by touching, clicking, or gazing at any point within the highlighted area. FIG. 9 also includes underlined hyperlinks embedded in the text, including the element 920. The element 920 can be interacted with by the user by touching, clicking, or gazing at any point in the highlighted hyperlink.

FIG. 10 is conceptual diagram illustrating example relationships among a view point and active elements, shown in reference to some example embodiments. The circle indicates the detected gaze point. The three highlighted words indicate interactive elements that are possible targets for the user's gaze. The solid line between the gaze point and the link labeled "exercitation" shows that the gaze point is more likely intended for that link than the two links indicated by dotted lines. With reference to process 800, the system may rank, in operation 860, the three possible interactive elements and determine that the top element, corresponding to the "exercitation" link, may be selected with a confidence higher than a confidence threshold. The link may then be activated directly as shown in operation 895. If in operation 860 the system cannot resolve with which element the user intends to interact (e.g. due to high noise in the gaze estimates), the system may overlay a zoom window in order to resolve the ambiguity, as shown in operation 890.

Figure 11A:
FIGS. 11A-11B are screen diagrams illustrating example interfaces, shown in reference to some example embodiments.
Figure 11B:
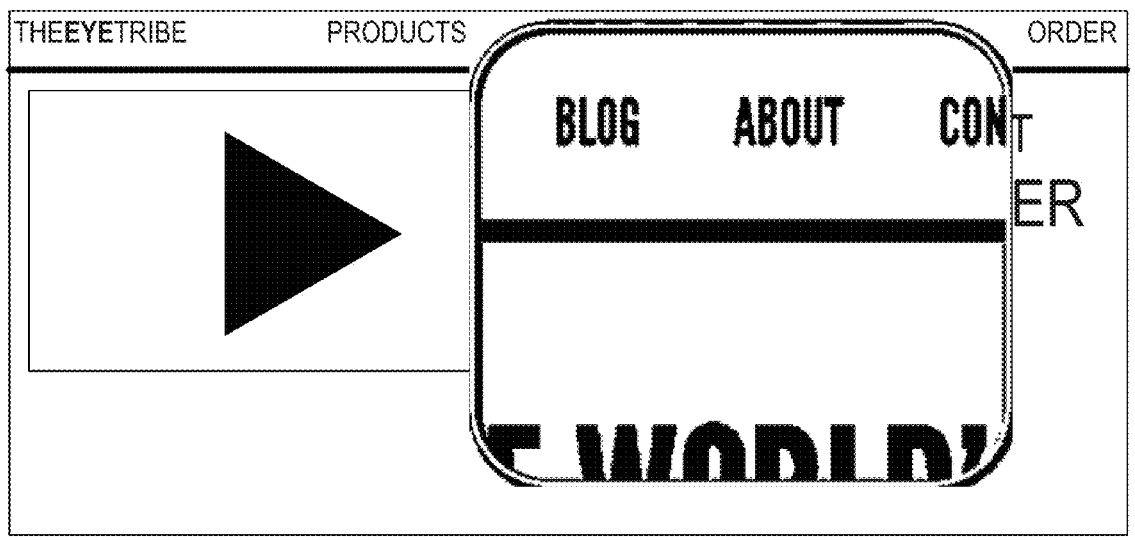

FIGS. 11A-11B are screen diagrams illustrating example interfaces, shown in reference to some example embodiments. FIG. 11A shows a portion of a web page, before a selection has been received. FIG. 11B shows a portion of the same web page, with a zoomed-in portion. With reference to process 800, described above, FIG. 11B may be generated during operations 860 and 890. For example, if each of "BLOG" and "ABOUT" are interactive elements and the user's gaze is detected between those elements, both interactive elements may be ranked and a confidence threshold may be calculated. The confidence of the top element may not be higher than the confidence threshold, and hence the overlay shown in FIG. 11B may be generated, providing additional screen space to the user to select between the probable targets of the command.

The methods and systems described herein may provide advantages over existing methods and systems. For example, dynamic calibration of an eye tracking system may allow a user to continue using the eye tracking system even when conditions have changed from the conditions used for the initial calibration, without requiring the user to stop using the system for recalibration. As another example, dynamic calibration of an eye tracking system may allow the use of an eye tracking system without an initial calibration or when the initial calibration is less thorough, since continued refinements may occur as the user uses the eye tracking system. As yet another example, controlling a zoom function based on a gaze location and the confidence with which the interactive elements may be selected may allow an application to operate with fewer unwanted commands and greater ease of use for the user. As another example, adjusting the zoom function based on the local accuracy or noise in the region where an interactive element is located may allow an application to operate accurately with fewer zoom windows being overlaid, allowing the user to perform selections faster.

Certain example embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various example embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In example embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other example embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In example embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 12:
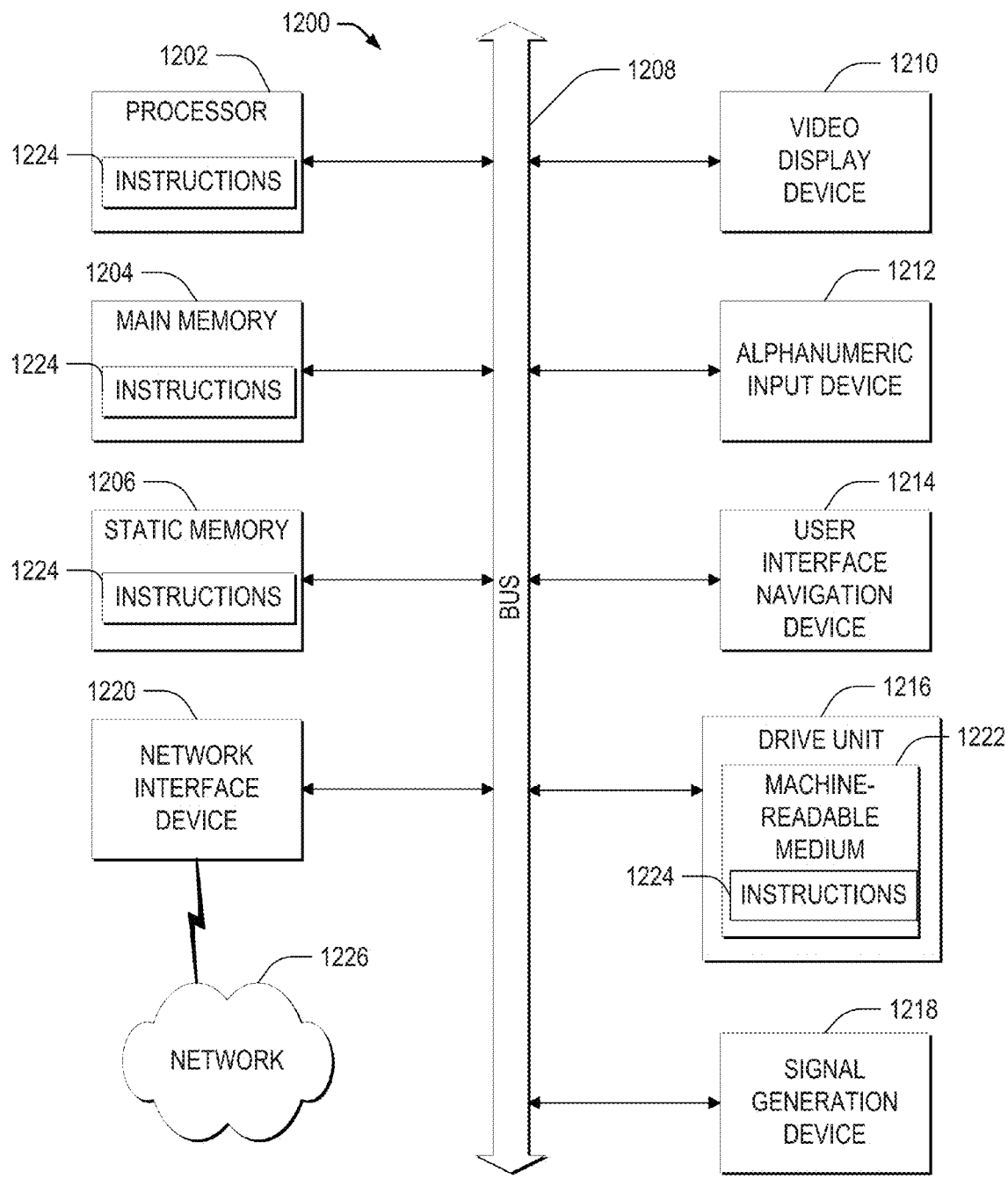
FIG. 12 is a block diagram of a machine in the example form of a computer system within which a set of instructions, for causing the machine to perform any one or more of the methodologies discussed herein, may be executed, according to some example embodiments.

FIG. 12 is a block diagram of a machine in the example form of a computer system 1200 within which instructions, for causing the machine to perform any one or more of the methodologies discussed herein, may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1200 includes a processor 1202 (e.g., a CPU, a GPU, or both), a main memory 1204, and a static memory 1206, which communicate with each other via a bus 1208. Computer system 1200 may further include a video display device 1210 (e.g., a liquid crystal display (LCD) or a cathode ray tube (CRT)). Computer system 1200 also includes an alphanumeric input device 1212 (e.g., a keyboard), a user interface (UI) navigation device 1214 (e.g., a mouse or touch sensitive display), a disk drive unit 1216, a signal generation device 1218 (e.g., a speaker), and a network interface device 1220.

Disk drive unit 1216 includes a machine-readable medium 1222 on which is stored one or more sets of instructions and data structures (e.g., software) 1224 embodying or utilized by any one or more of the methodologies or functions described herein. Instructions 1224 may also reside, completely or at least partially, within main memory 1204, within static memory 1206, or within processor 1202 during execution thereof by computer system

1200, with main memory 1204 and processor 1202 also constituting machine-readable media.

While machine-readable medium 1222 is shown in an example embodiment to be a single medium, the term "machine-readable medium" may include a single medium or multiple media (e.g., a centralized or distributed database, or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present technology, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc read-only memory (CD-ROM) and digital video disc read-only memory (DVD-ROM) disks.

Instructions 1224 may further be transmitted or received over a communications network 1226 using a transmission medium. Instructions 1224 may be transmitted using network interface device 1220 and any one of a number of well-known transfer protocols (e.g., hypertext transport protocol (HTTP)). Examples of communication networks include a local area network (LAN), a wide area network (WAN), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although the inventive subject matter has been described with reference to specific example embodiments, it will be evident that various modifications and changes may be made to these embodiments without departing from the scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The example embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A device comprising:
   a display;
   a memory having instructions embodied thereon; and
   one or more processors configured by the instructions to perform operations comprising:
   maintaining a buffer with gaze information of a user of a computing device, the gaze information including one or more elements of data for each gaze capture, the one or more elements of data identifying an estimated gaze location that provides an estimation of a position on the display where the user is looking at a timestamp, the one or more elements of data being determined for each gaze capture by an eye tracking module at the timestamp based on light captured by a camera of the eye tracking module after reflection from an eye of the user;
   during execution of an application on the computing device, detecting a user interaction at an interaction location on the display of the computing device, the user interaction occurring at an interaction time;
   in response to the detection of the user interaction, selecting a portion of the gaze information from the buffer, the selected portion comprising information about one or more gaze captures occurring within a threshold time period before the interaction time;
   based on the portion of the gaze information and the interaction location, calculating one or more calibration parameters specific to the user including at least one of: offsets between optical and visual axes of the eye, a radius of a cornea of the eye, a distance between a center of the cornea and a center of a pupil of the eye;
   determining, by the eye tracking module, eye feature information including components of a vector difference between the center of the pupil and a corneal reflection of the eye; and
   computing a point of regard of the user on the display based on the eye feature information and the one or more calibration parameters.

2. The device of claim 1, wherein the operations further comprise:
   clustering the portion of gaze information into a set of clusters of gaze fixations of the user on the display;
   selecting a cluster from the set of clusters based on distances of the gaze fixations from the interaction location; and
   calculating the one or more calibration parameters based on the selected cluster.

3. The device of claim 1, wherein the operations further comprise:
   clustering the portion of the gaze information into a set of clusters of gaze fixations of the user on the display;
   selecting a cluster from the set of clusters based on a quality metric; and
   calculating the one or more calibration parameters based on the selected cluster.

4. The device of claim 3, wherein the quality metric is based on a factor selected from the group consisting of a distance of a gaze fixation in the cluster from the interaction location, a time of the gaze fixation relative to the interaction time, and intra-cluster coherence.

5. The device of claim 1, wherein:
   the one or more elements of data for each gaze capture in the selected portion of the gaze information includes one or more eye features estimated by the eye tracking module and the estimated gaze location; and the operations further comprise:
   storing information about the one or more eye features and the estimated gaze location into a calibration data structure; and
   calculating the one or more calibration parameters based on the information stored in the calibration data structure.

19

6. The device of claim 5, wherein the operations further comprise:
computing a quality metric of at least one element of data in the selected portion of the gaze information associated with the information stored in the calibration data structure;
removing low-quality elements from the calibration data structure based on the quality metric; and
calculating the one or more calibration parameters based on remaining information stored in the calibration data structure after removing the low-quality elements.

7. The device of claim 6, wherein the quality metric is based on a location on the display associated with the at least one element relative to the interaction location.

8. The device of claim 6, wherein the quality metric is based on a time elapsed since the timestamp when the one or more eye features were captured by the eye tracking module.

9. The device of claim 6, wherein the quality metric is based on an estimation error associated with the estimated gaze location.

10. A method comprising:
maintaining a buffer with gaze information of a user of a computing device, the gaze information including one or more elements of data for each gaze capture, the one or more elements of data identifying an estimated gaze location that provides an estimation of a position on a display of the computing device where the user is looking at a timestamp, the one or more elements of data being determined for each gaze capture by an eye tracking module at the timestamp based on light captured by a camera of the eye tracking module after reflection from an eye of the user;
during execution of an application on the computing device, detecting a user interaction at an interaction location on the display of the computing device, the user interaction occurring at an interaction time;
in response to the detection of the user interaction, selecting a portion of the gaze information from the buffer, the selected portion comprising information about one or more gaze captures occurring within a threshold time period before the interaction time;
based on the portion of the gaze information and the interaction location, calculating one or more calibration parameters specific to the user including at least one of: offsets between optical and visual axes of the eye, a radius of a cornea of the eye, a distance between a center of the cornea and a center of a pupil of the eye;
determining, by the eye tracking module, eye feature information including components of a vector difference between the center of the pupil and a corneal reflection of the eye; and
computing a point of regard of the user on the display based on the eye feature information and the one or more calibration parameters.

11. The method of claim 10, further comprising:
clustering the portion of gaze information into a set of clusters of gaze fixations of the user on the display;
selecting a cluster from the set of clusters based on distances of the gaze fixations from the interaction location; and
calculating the one or more calibration parameters based on the selected cluster.

12. The method of claim 10, further comprising:
clustering the portion of the gaze information into a set of clusters of gaze fixations of the user on the display;

20 selecting a cluster from the set of clusters based on a quality metric; and
calculating the one or more calibration parameters based on the selected cluster.

13. The method of claim 12, wherein the quality metric is based on a factor selected from the group consisting of a distance of a gaze fixation in the cluster from the interaction location, a time of the gaze fixation relative to the interaction time, and intra-cluster coherence.

14. The method of claim 10, wherein:
the one or more elements of data for each gaze capture in the selected portion of the gaze information includes one or more eye features estimated by the eye tracking module and the estimated gaze location; and the method further comprising:
storing information about the one or more eye features and the estimated gaze location into a calibration data structure; and
calculating the one or more calibration parameters based on the information stored in the calibration data structure.

15. The method of claim 14, further comprising:
computing a quality metric of at least one element of data in the selected portion of the gaze information associated with the information stored in the calibration data structure;
removing low-quality elements from the calibration data structure based on the quality metric; and
calculating the one or more calibration parameters based on remaining information stored in the calibration data structure after removing the low-quality elements.

16. The method of claim 15, wherein the quality metric is based on a location on the display associated with the at least one element relative to the interaction location.

17. The method of claim 15, wherein the quality metric is based on a time elapsed since the timestamp when the one or more eye features were captured by the eye tracking module.

18. The method of claim 15, wherein the quality metric is based on an estimation error associated with the estimated gaze location.

19. A non-transitory machine-readable storage medium storing instructions which, when executed by one or more processors, cause the one or more processors to perform operations comprising:
maintaining a buffer with gaze information of a user of a computing device, the gaze information including one or more elements of data for each gaze capture, the one or more elements of data identifying an estimated gaze location that provides an estimation of a position on a display of the computing device where the user is looking at a timestamp, the one or more elements of data being determined for each gaze capture by an eye tracking module at the timestamp based on light captured by a camera of the eye tracking module after reflection from an eye of the user;
during execution of an application on the computing device, detecting a user interaction at an interaction location on the display of the computing device, the user interaction occurring at an interaction time;
in response to the detection of the user interaction, selecting a portion of the gaze information from the buffer, the selected portion comprising information about one or more gaze captures occurring within a threshold time period before the interaction time;
based on the portion of the gaze information and the interaction location, calculating one or more calibration parameters specific to the user including at least one of: offsets between optical and visual axes of the eye, a radius of a cornea of the eye, a distance between a center of the cornea and a center of a pupil of the eye;

determining, by the eye tracking module, eye feature information including components of a vector difference between the center of the pupil and a corneal reflection of the eye; and computing a point of regard of the user on the display based on the eye feature information and the one or more calibration parameters.

20. The non-transitory machine-readable medium of claim 19, wherein the operations further comprise:

clustering the portion of gaze information into a set of clusters of gaze fixations of the user on the display;

selecting a cluster from the set of clusters based on distances of the gaze fixations from the interaction location; and calculating the one or more calibration parameters based on the selected cluster.

* * * * *